United States Patent
Aoki (10) Patent No.: US 7,649,565 B2
(45) Date of Patent: Jan. 19, 2010

(54) POWER SUPPLY CIRCUIT FOR DIGITAL CAMERA

(75) Inventor: Kazumasa Aoki, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 691 days.

(21) Appl. No.: 10/930,802

(22) Filed: Sep. 1, 2004

(65) Prior Publication Data

US 2005/0094029 A1   May 5, 2005

(30) Foreign Application Priority Data

Sep. 9, 2003   (JP)   ............................. 2003-317019

(51) Int. Cl.
H04N 5/225 (2006.01)
H04N 5/222 (2006.01)
G03B 7/26 (2006.01)

(52) U.S. Cl. .................. 348/372; 348/370; 348/371; 396/278; 396/303

(58) Field of Classification Search ................. 348/372, 348/370, 371, 333.13; 396/303, 278; 315/302; 323/220–354

See application file for complete search history.

(56) References Cited

U.S. PATENT DOCUMENTS

| | | | |
|---|---|---|---|
| 4,733,264 A | 3/1988 | Hatase et al. | |
| 4,763,154 A | 8/1988 | Iguchi et al. | |
| 4,777,505 A | 10/1988 | Hata et al. | |
| 4,818,921 A | 4/1989 | Hata et al. | |
| 4,831,405 A | 5/1989 | Hata et al. | |
| 4,965,462 A * | 10/1990 | Crawford | 307/66 |
| 5,297,077 A | 3/1994 | Imai et al. | |
| 5,345,284 A * | 9/1994 | Tsuruta | 396/190 |
| 5,631,458 A | 5/1997 | Nakahira et al. | |
| 5,659,206 A | 8/1997 | Taguchi et al. | |
| 5,809,315 A * | 9/1998 | Ohtsuka | 713/323 |
| 5,926,661 A * | 7/1999 | Maeno | 396/277 |
| 6,064,176 A | 5/2000 | Odaka | |
| 6,075,566 A * | 6/2000 | Suemoto et al. | 348/372 |
| 6,320,357 B1* | 11/2001 | Peters et al. | 323/222 |
| 6,488,390 B1* | 12/2002 | Lebens et al. | 362/231 |
| 6,577,820 B2* | 6/2003 | Yamaguchi et al. | 396/61 |
| 6,650,833 B1* | 11/2003 | Oda et al. | 396/89 |
| 6,850,039 B2* | 2/2005 | Popescu | 320/134 |
| 2002/0172514 A1* | 11/2002 | Gabello et al. | 396/109 |
| 2003/0076438 A1* | 4/2003 | Ishimaru | 348/372 |
| 2003/0231009 A1* | 12/2003 | Nemoto et al. | 323/276 |

FOREIGN PATENT DOCUMENTS

| | | |
|---|---|---|
| JP | 03-283079 | 12/1991 |
| JP | H07-168259 A | 7/1995 |

(Continued)

Primary Examiner—John M Villecco
Assistant Examiner—Christopher K Peterson
(74) Attorney, Agent, or Firm—Oblon, Spivak, McClelland, Maier & Neustadt, L.L.P.

(57) ABSTRACT

A power supply circuit for a digital camera, including a DC power supply device for supplying direct current power; an image inputting device driven by the DC power supply device; a light emitting diode device driven by the DC power supply device and which auxiliary illuminates a subject to be imaged by the image inputting device; and a backup device connected to an output side of the DC power supply device and adapted for preliminarily charging the direct current power.

4 Claims, 8 Drawing Sheets

FOREIGN PATENT DOCUMENTS

| | | |
|---|---|---|
| JP | H08-101733 A | 4/1996 |
| JP | H11-084462 A | 3/1999 |
| JP | 2002-116481 | 4/2002 |
| JP | 2003-140236 A | 5/2003 |
| JP | 2003-215674 | 7/2003 |

* cited by examiner

POWER SUPPLY CIRCUIT FOR DIGITAL CAMERA

BACKGROUND OF THE INVENTION

1. Field of the Invention

The present invention relates to a power supply circuit for a digital camera, and more specifically, to a power supply circuit for the digital camera so configured as to cause no voltage drop even at the time of activation of LEDs.

2. Description of the Related Art

As auxiliary light for an image inputting device of a digital camera, a strobe utilizing an arc tube in which emitted light quantity is large for example has been widely used in a camera. On the other hand, LEDs (Light Emitting Diodes) having large luminance have recently come to be available by development of semiconductors. The LED has an advantage over the strobe light in that color temperature is adjustable in a case of the LED if three colors of R, G and B are used, and thereby irradiation of almost perfect white is possible.

However, a plurality of LEDs has to be used for the emission in order to obtain the light quantity equivalent to that of the strobe conventionally used, and therefore, a large amount of current flows when the LEDs operate. In such case, a voltage drop occurs particularly if a battery having large internal resistance, such as an alkaline cell is used. This may cause the power supply supplied to the entire digital camera to generate power supply voltage lower than that sufficient for the camera to operate, so that the image inputting device becomes unable to operate thereby.

Particularly, the luminance, the color, etc. are unstable in the early stage of lighting of the LED. Accordingly, it is necessary to flow more current at the time of activation of the LED than in a steady state so as to reduce start-up time, hence the voltage drop becomes severer. Therefore, measures against such problem have to be taken.

Figure 5A:
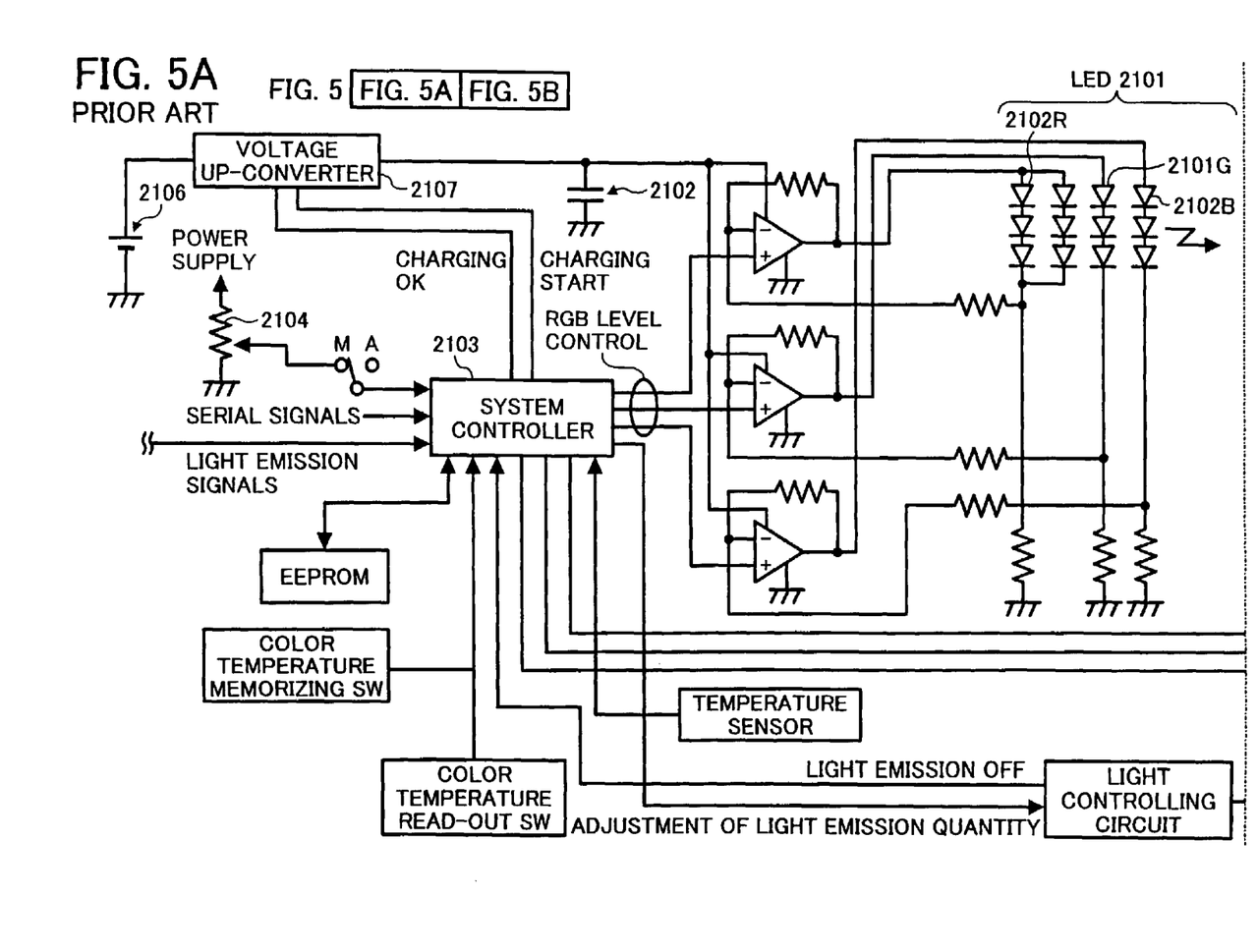
FIG. 5 is a block diagram of a conventional example.
Figure 5B:
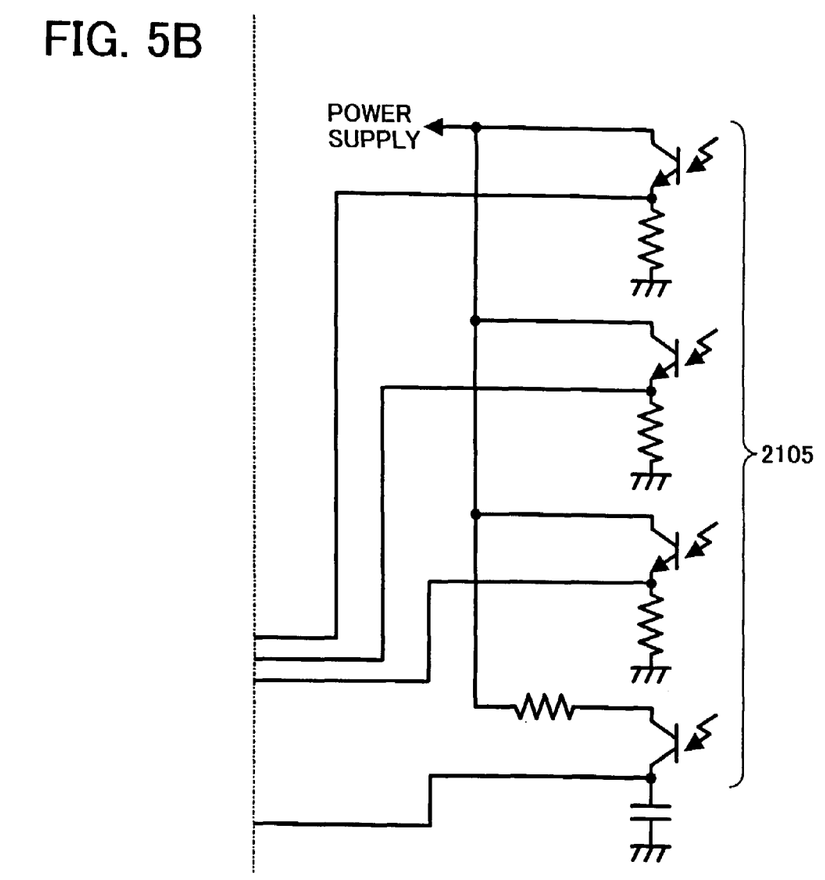

For example, JP-A 2002-116481 discloses that LEDs 2101 of R, G and B (2101R, 2101G and 2101B) are used as a strobe light source, as shown in FIG. 5. According to the disclosure, electrical energy stored in a capacitor 2102 is supplied to each of the LEDs 2101, and a system controller 2103 controls a quantity of light emission of each of the LEDs 2101 so as to reach color temperature set manually by a color temperature setting volume 2104 or color temperature of a photographing field detected by a color temperature sensor 2105.

It teaches that, accordingly, the color temperature in a color of light emission can be changed manually or automatically by using the strobe light source which is capable of adjusting the color temperature, such as the LEDs of R, G and B.

Also, JP-A 2003-215674 discloses that the LEDs 2101 of R, G and B (2101R, 2101G and 2101B) are used as a strobe light source, likewise as shown in FIG. 5. According to the disclosure, a number ratio among three-color light emitting elements is set corresponding to a ratio of emitted light quantities of the respective light emitting elements of the LEDs 2101 so that the color temperature of strobe light by the three-color light emitting elements may become a desired one.

It teaches that a new stroboscopic device for camera using the LED or the like can be provided, which is capable of easily control the emitted light quantity of the respective light emitting elements of R, G and B.

Meanwhile, a more advantageous effect is obtained if the LED and the strobe are combined together and either one of them or both is used according to a condition of photographing. It is possible to carry out the most appropriate photographing according to the condition of photographing, for example, by arranging and lighting the LED adjacent to a photographing device when performing close-photographing, or by using the strobe when performing distant-view photographing. In such case, if power supplies are provided separately for the LED and for the strobe, a size of the device becomes large and thus convenience of user is impaired.

According to the proposals made in the above-mentioned JP-A 2002-116481 and JP-A 2003-215674, however, since a battery 2106 and a boosting up-converter (voltage up-converter) 2107 are directly connected to each other for the power supply as shown in FIG. 5, they cannot solve the above-mentioned problem that it is necessary to flow more current at the time of activation of the LED than in the steady state, which causes severer voltage drop.

In addition, with regard to the point mentioned above that more advantage effect can be obtained if the LED and the strobe are combined and either one of them or both is used according to the condition of photographing, both JP-A 2002-116481 and JP-A 2003-215674 use only the LED and do not disclose the combined use of the LED with the strobe.

SUMMARY OF THE INVENTION

The present invention has been made in view of the above-mentioned problem. Therefore, it is an object of the present invention to provide a power supply circuit for a digital camera so configured as to cause no voltage drop even at the time of activation of LEDs.

Also, it is another object of the present invention to provide a power supply circuit for a digital camera configured such that a size of power supply does not become large even if the LED and a strobe are used in combination.

To accomplish the above mentioned objects, a power supply circuit for a digital camera of the present invention comprises a DC power supply device for supplying direct current power; an image inputting device driven by the DC power supply device; a light emitting diode device driven by the DC power supply device and which auxiliary illuminates a subject to be imaged by the image inputting device; and a backup device connected to an output side of the DC power supply device and adapted for preliminarily charging the direct current power.

According to the present invention, the backup device is preliminarily charged by the DC power supply device at the time when the light emitting diode device is not in use. Since the direct current power is supplied to the light emitting diode device from both the DC power supply device and the backup device when using the light emitting diode device, supply voltage will not decrease.

DESCRIPTION OF THE PREFERRED EMBODIMENTS

First, preferred embodiments (1) to (5) of the power supply circuit for the digital camera according to the present invention are recited. Any combinations thereof are considered to be preferred ones of the present invention unless any contradictions occur.

(1) The DC power supply device (first BATT 10 in FIG. 1, for example, a lithium-ion battery) comprises an output current limiting and protecting device (output overcurrent protecting circuit 11) for limiting output current, and a charged current limiting device (current limiting resistor R10) for limiting charged current supplied to the backup device is provided between the DC power supply device and the backup device (first backup block 13).

Figure 1:
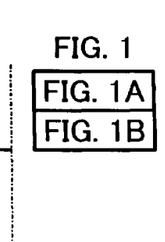
FIG. 1 is a circuit diagram according to an embodiment 1 of the present invention.
Figure 1A:
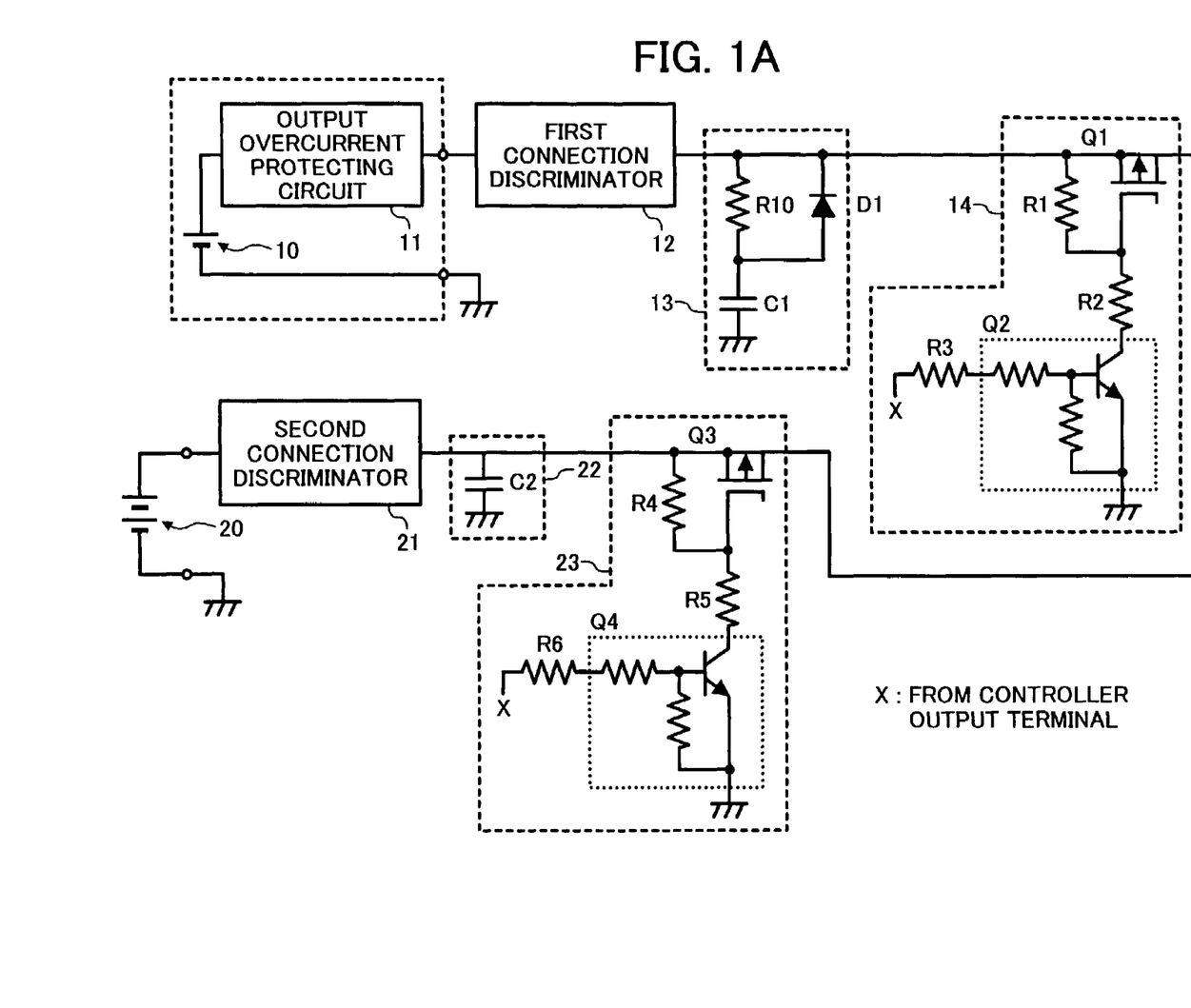
Figure 1B:
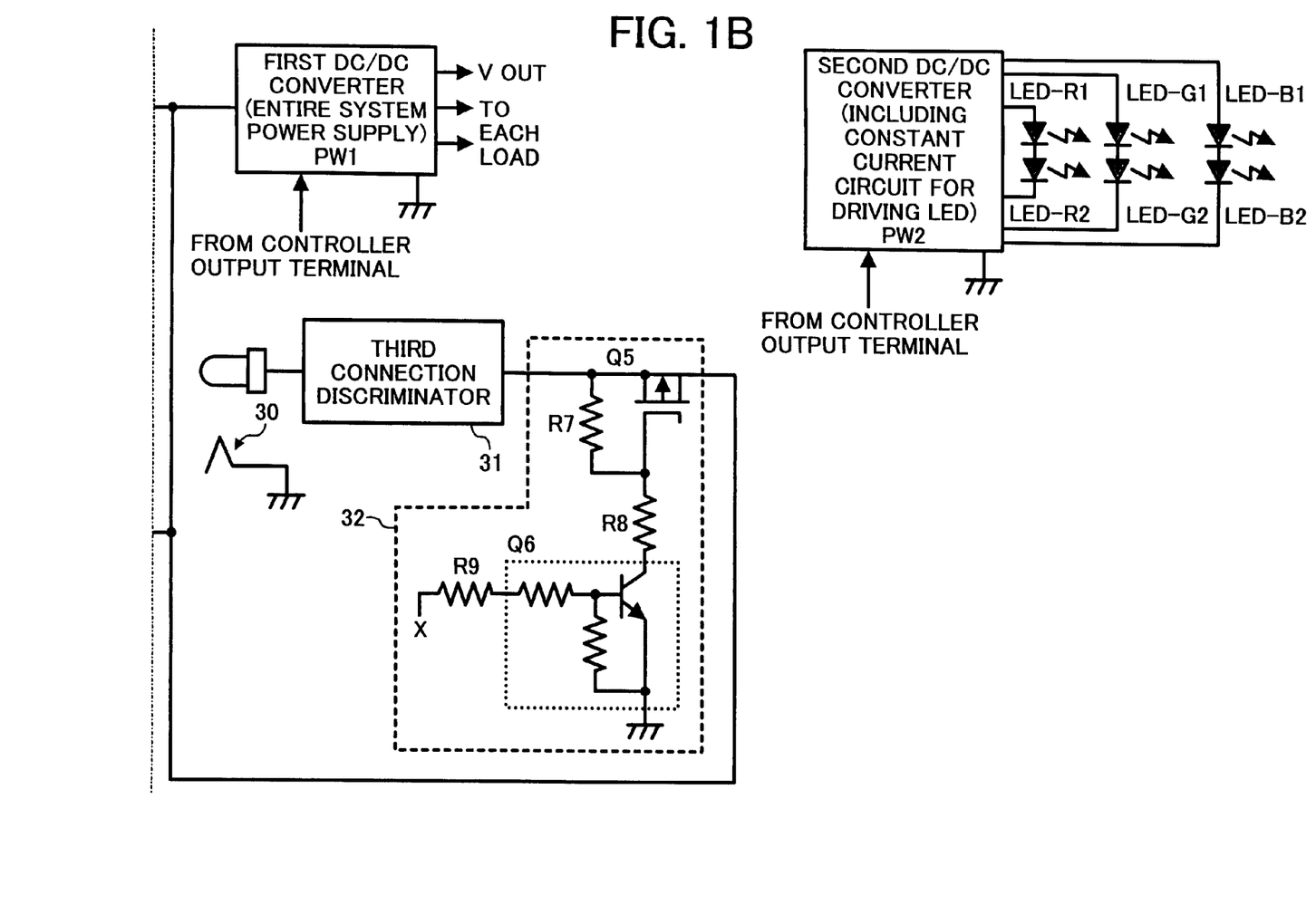
Figure 4A:
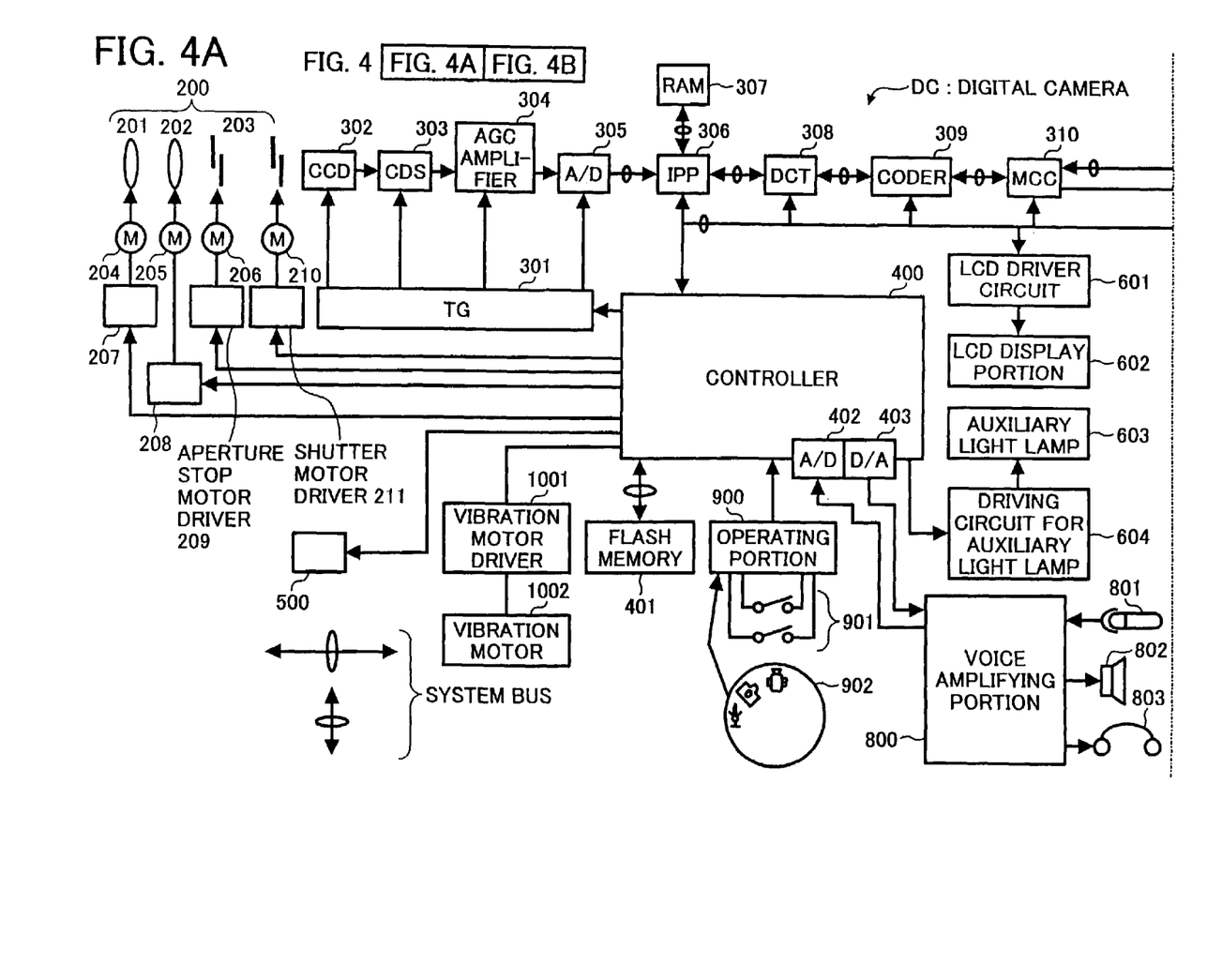
FIG. 4 is a block diagram showing the entire structure of a digital camera.
Figure 4B:
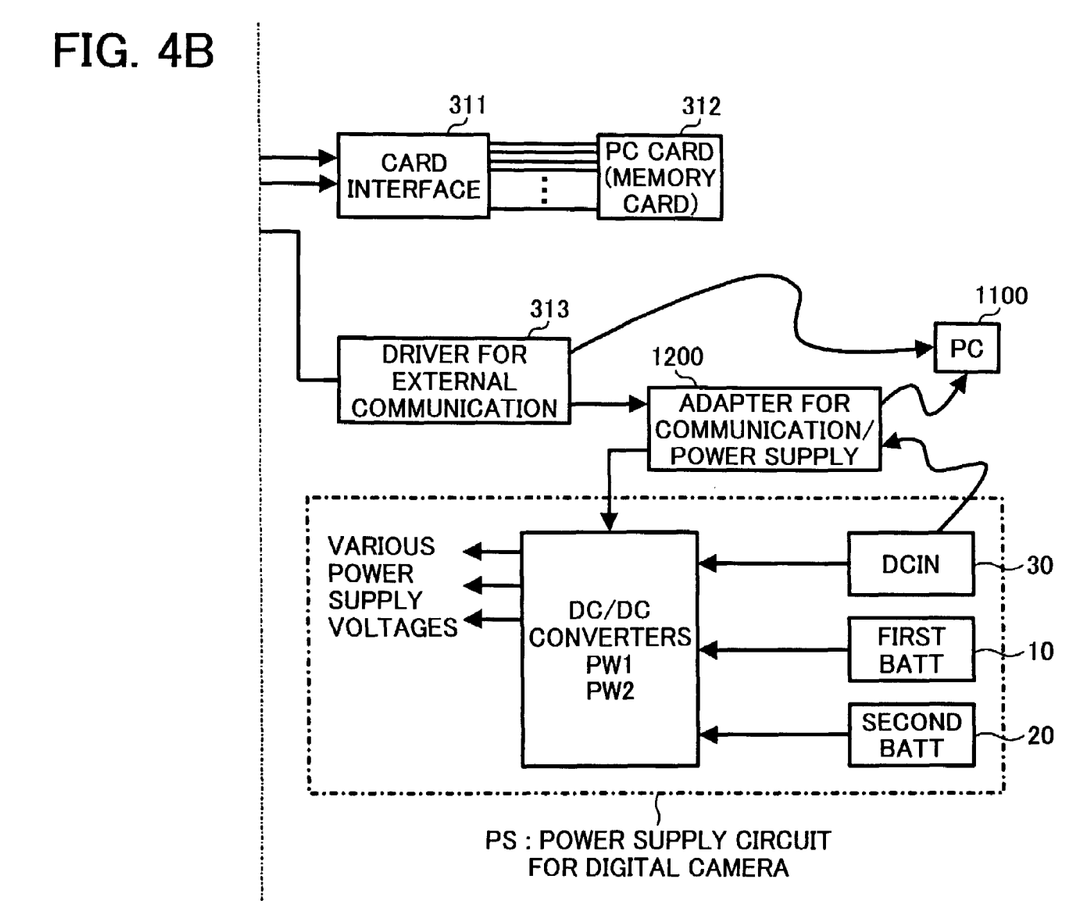

The above mentioned structure according to this embodiment is illustrated in FIGS. 1 and 4 by way of example. If there is no charged current limiting device (current limiting resistor R10), large current flows when the DC power supply device (first BATT 10) is connected to the backup device (first backup block 13). Consequently, the output current limiting and protecting device (output overcurrent protecting circuit 11) operates and the DC power supply device (first BATT 10) is set in a non-operated state, thereby causing a problem. However, since this embodiment is provided with the charged current limiting device (current limiting resistor R10), rush current which flows to the backup device (first backup block 13) is limited, thereby preventing the aforementioned problem.

(2) The DC power supply device comprises a general-purpose primary battery (second BATT 20, for example, the alkaline cell) and an exclusive-use secondary battery (first BATT 10, for example, a lithium-ion battery) which has the output current limiting and protecting device (output overcurrent protecting circuit 11), and the power supply circuit further comprises a selector (first use power supply selecting block 14, second use power supply selecting block 23, controller 400 and so on) for allowing only either the primary battery or the second battery to be used, and whether the charged current limiting device (current limiting resistor RIO) is connected between the secondary battery and the backup device (first backup block 13) or not is selectable in this embodiment.

The above mentioned structure according to this embodiment is illustrated in FIGS. 1 and 4 by way of example. According to this structure, it is possible to use either only one of the general-purpose primary battery (second BATT 20) and secondary battery (first BATT 10) by the selector. Although voltage drop occurs when the general-purpose primary battery (second BATT 20) is selected due to large internal resistance thereof, it is possible to backup the voltage drop with backup voltage of the backup device (second backup block 22).

In addition, in a case where the exclusive-use secondary battery (first BATT 10) is selected, the rush current which would flow to the backup device (first backup block 13) is limited to suppress the voltage drop, since this embodiment is provided with the charged current limiting device (current limiting resistor R10). Alternatively, it is possible to virtually eliminate influence of the voltage drop at the time of charging the backup device (first backup block 13) if an exclusive-use secondary battery having large capacity is used. Accordingly, there is no need to connect the charged current limiting device (current limiting resistor R10) between the secondary battery and the backup device (first backup block 13) when the exclusive-use secondary battery has large.

(3) When connecting a separate power supply (for example, an external adapter connected to DCIN 30) having the output current limiting and protecting device (equal to the output overcurrent protecting circuit 11) in place of the exclusive-use secondary battery (first BATT 10 shown in FIG. 1, for example, a lithium-ion battery), whether the charged current limiting device (equal to the current limiting resistor R10) is connected between the separate power supply and the backup device (not shown in the drawing) or not is selectable in this embodiment.

The above mentioned structure according to this embodiment is illustrated in FIGS. 1 and 4 by way of example. According to this structure, since an output current limiting circuit is generally built in the separate power supply (the external adapter connected to DCIN 30) as well, an effect of avoiding the non-operation by the charging of the backup device is obtained. In this embodiment, since output resistance is low and there is virtually no voltage drop, the connection of the charged current limiting device may be disconnected in certain instances.

(4) The separate power supply is a direct current power supply having rectified a power supply of commercial alternating current.

This embodiment is convenient for the user, since a direct current power supply unit for rectifying the commercial alternating current is available in the market as a general AC adapter.

(5) The backup device is configured to be used to backup a temporal voltage drop caused by rush current which flows when the light emitting diode device is activated to light.

The above mentioned structure according to this embodiment is illustrated in FIGS. 1 and 4 by way of example. In the light emitting diode device (LED), more current flows at the time of activation of a LED drive circuit than in a steady-state, and thereby the voltage drop becomes severe, since the rush current flows by the activation of the LED drive circuit in the initial stage of lighting thereof. Since it is possible to reduce capacity of the backup device if measures are taken only against the voltage drop, an advantage effect is obtained that start-up time immediately after exchanging of the batteries can be reduced.

Also, to accomplish the above mentioned objects, a power supply circuit for a digital camera of the present invention comprises a general-purpose battery; an image inputting device driven by the general-purpose battery; a light emitting diode device driven by the general-purpose battery and which auxiliary illuminates a subject to be imaged by the image inputting device; a strobe emitter driven by the general-purpose battery and which auxiliary illuminates the subject to be imaged by the image inputting device; and an auxiliary lighting selector capable of selecting whether to use the light emitting diode device or the strobe emitter, wherein drive power of the light emitting diode device is supplied from a circuit which drives the strobe emitter when the light emitting diode device is selected.

Figure 3:
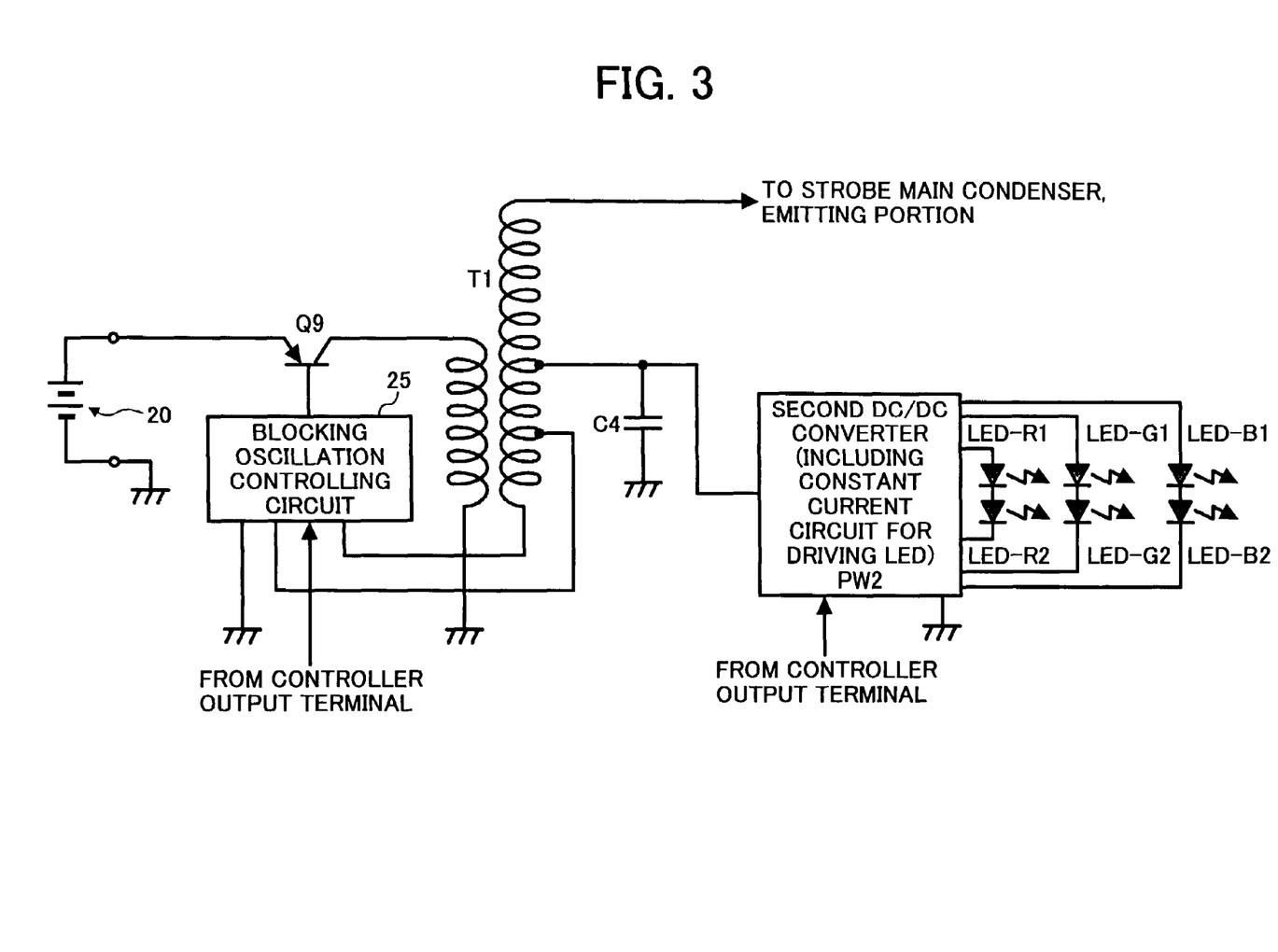
FIG. 3 is a circuit diagram according to an embodiment 3 of the present invention.

The above mentioned structure according to this invention is illustrated in FIGS. 1, 3 and 4 by way of example. More advantageous irradiating effect is obtained if a first auxiliary lighting device (LED) and a second auxiliary lighting device (strobe) are used in combination as in this structure and either one of them or both is used according to a condition of photographing. It is possible to carry out the most appropriate photographing according to the condition of photographing, for example, by arranging and lighting the LED adjacent to a photographing device when performing close-photographing, or by using the strobe when performing distant-view photographing. If power supplies are provided respectively, a size of the device becomes large and thus the convenience of user is impaired. Therefore, by using a part of a strobe power supply (blocking oscillation controlling circuit 25, transformer T1 and so on) as a power supply for the auxiliary lighting of the LED, it is possible to solve the problem which the size of the device becomes large.

According to the present invention, the backup element is connected between the battery and a LED driving power supply to solve the problem caused by the voltage drop of the battery.

Also, the present invention solves the problem that the device becomes large, by using the part of the strobe power supply as the power supply for auxiliary lighting of the LED.

Embodiment 1

FIG. 1 is a circuit diagram according to the embodiment 1 of the present invention. FIG. 4 is a block diagram showing the entire structure of a digital camera.

As shown in FIG. 1, in a power supply circuit PS for the digital camera, power is supplied to a system of the digital camera by an exclusive-use battery being exclusively used for the digital camera (first BATT 10), a general-purpose battery (a second BATT 20), and a DCIN (direct current power input terminal) 30 as an external power supply. Meanwhile, a position where the power supply circuit PS for the digital camera is located in the entire digital camera is shown in a right side of FIG. 4. A detailed structure shown in FIG. 4 will be described later.

It is assumed that the first BATT (battery, DC power supply device) 10 as the exclusive-use battery is, for example, a lithium-ion battery as a secondary battery. The first BATT 10 is connected with an overcurrent preventing circuit (output overcurrent protecting circuit) 11 inside the battery or at an output portion thereof.

The second BATT 20 (DC power supply device) is a battery in which output emerges directly like a size AA battery (for example, a general-purpose battery such as an alkaline cell and a nickel-hydride battery). Such an overcurrent preventing circuit 11 is not connected unlike the case of the first BATT 10. In addition, internal resistance is generally larger in the second BATT 20 than the first BATT 10.

The DCIN 30 is an input terminal for supplying direct current power from the external power supply. It is assumed that a commonly-used AC adapter (which converts commercial alternating current power into direct current) is used, but it is possible to connect other input unit (such as external battery pack).

Meanwhile, the battery can be used singly (the first BATT 10 only, or the second BATT 20 only), or both can be used while connected to the system. However, it is configured that either only one of them is connectable when the digital camera is in use. Also, when the external power supply such as AC adapter is connected in the state that the battery is connected, such a control is carried out to give priority to the external power supply over the battery so as to be able to prolong the life of the battery.

The first BATT 10, the second BATT 20, and DCIN 30 are connected with connection discriminators 12, 21, and 31, respectively, which makes a controller (controller for controlling the entire digital camera) 400 shown in FIG. 4 to recognize which of the power supply (DCIN) and the batteries (first BATT 10, second BATT 20) is connected.

The connection discriminators 12, 21 and 31 may be reduced to two discriminators, or one, depending upon the order of priority of the recognition.

In the present embodiment, it is illustrated that backup elements for preventing the voltage drop at the time of activation of the LED are respectively connected to the first BATT 10 and the second BATT 20.

A large-capacity capacitor such as an electric double layer capacitor is used as the backup element. Here, if the controller 400 recognized that the battery 10 is connected, the first BATT 10 is connected with a first backup block 13 (backup device) in which a current limiting resistor R10, a backup element C1, and a discharging direction-rectifying element D1 are included. When the battery (first BATT 10) is connected, the backup element C1 is charged through the current limiting resistor R10.

When the digital camera DC is activated and H-signals are sent to a current limiting resistor R3 in a first use power supply selecting block 14 from the controller 400, a transistor Q2 is turned on, and a divided portion of the battery voltage by dividing resistors R1 and R2 is applied to a gate of a transistor Q1 with respect to a MOSFET of the transistor Q1, thereby the transistor is turned on.

Accordingly, power is applied to a DC/DC converter PW1 for system power supply.

Thereafter, when operating signals are inputted into the first DC/DC converter (DC/DC converter for system power supply) PW1 from the controller 400, the first DC/DC converter PW1 is operated, thereby a system of the digital camera operates and an image inputting device (lens system 200, CCD 302 and so on shown in FIG. 4) is operated.

Then, when operating signals are inputted into a second DC/DC converter (DC/DC converter for LED drive) PW2 from the controller 400, power is supplied to the LED and thereby the LED is lighted. Output voltage of the battery is reduced by the internal resistance of the battery due to rush current or operating current caused at the time of activation of the LED. When the output voltage becomes lower than Vf of the discharging direction-rectifying element D1, the element D1 is turned on and thereby the power is supplied from the backup element C1 to perform operation for moderating further drop in voltage.

Similarly in the second BATT 20, a backup element C2 in a second backup block 22 (backup device) is connected directly to an output side of the battery, and dividing resistors R4 and R5, a current limiting resistor R6, transistors Q3 and Q4, the first DC/DC converter PW1 and the second DC/DC converter PW2 are operated in a sequence similar to that of the first BATT 10.

In the second BATT 20 in which there is no need for worrying about a non-operation thereof caused by activation of the output overcurrent protecting circuit 11, the power is directly supplied from the backup element C2, thereby to moderate loss in the Vf of the discharging direction-rectifying element D1. Meanwhile, it may also be that the first BATT 10 has a structure similar to that of the second backup block 22, if necessary.

Embodiment 2

Figure 2:
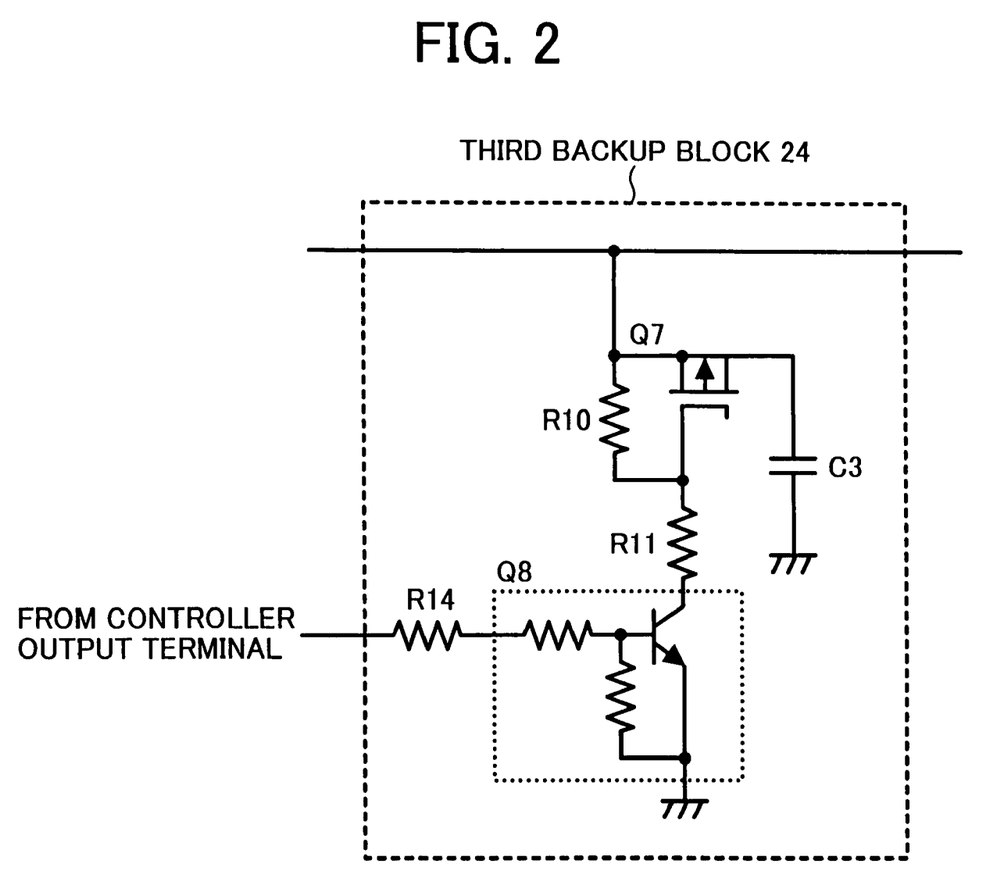
FIG. 2 is a circuit diagram according to an embodiment 2 of the present invention.

FIG. 2 is a circuit diagram according to the embodiment 2 of the present invention.

It is assumed here that a third backup block 24 shown in FIG. 2 is connected in FIG. 1 in place of the second backup block 22, for example.

In such case, depending on a direction of a parasitic diode in MOSFET of each of the transistors Q1 and Q3 shown in FIG. 1, for example, presuming that a battery side of each of the respective transistors Q1 and Q2 is a cathode and DC/DC converter side thereof is an anode, there is a fear that a backup element C3 is turned on through the parasitic diode of the transistor Q3 even when the transistor Q1 is turned on if there is no third backup block 24.

Accordingly, the backup element C3 is connected with the first BATT 10, so that the rush current flows. Consequently, the system of the digital camera is halted due to the operation of the output overcurrent protecting circuit 11 provided in the first BATT 10.

In order to eliminate this problem, a transistor Q7 included in the third backup block 24 is turned off. The transistor Q7 enables the backup element C3 to be charged, by turning on the transistor Q7 and a transistor Q8 through a current limiting resistor R14 with the H-signals as control signals sent from the controller 400 shown in FIG. 4, when the second BATT 20 is in use.

When the second BATT 20 is connected, the above-mentioned problem can be solved if a state where the transistor Q7 is turned off is maintained while remaining the signals sent to the current limiting resistor R14 as L-signals.

Embodiment 3

FIG. 3 is a circuit diagram according to the embodiment 3 of the present invention.

Meanwhile, although it is shown in FIG. 3 that the second BATT 20 is connected as the power supply, it is possible to connect the first BATT 10 and/or DCIN 30 as in the embodiment 1.

The present embodiment includes a conventional strobe charging circuit, which is constructed by a switching transistor Q9, a blocking oscillation controlling circuit 25 (circuit which drives a strobe emitter) and a boosting transformer T1 (circuit which drives the strobe emitter). The output side from the boosting transformer T1 is connected to a not-shown main capacitor which stores energy for emission of the strobe and to an emitting portion.

On the other hand, the output which is tapped down by and outputted from the boosting transformer T1 drives and lights the LED through a ripple removing capacitor C4 and the second DC/DC converter PW2 with a constant voltage drive. The LED unit is connected to respective LEDs (R1, R2, G1, G2, B1 and B2) of R, G and B of the LED unit, similar to the above-mentioned embodiment 1.

When the blocking oscillation controlling circuit 25 is driven by the controller 400, power is generated at a secondary side of the boosting transformer T1, and the power generated is applied to the second DC/DC converter PW2 through the ripple removing capacitor C4. Thereafter, the second DC/DC converter PW2 is operated through an output terminal of the controller 400 to light the LED.

Lastly, the structure of the system of the digital camera DC to which the present invention is applied will be described with reference to FIG. 4.

The power supply circuit PS for the digital camera explained in the embodiments 1 to 3 is shown in the right side of FIG. 4. However, since it has already been explained, overlapping explanations are omitted.

The lens system 200 comprises a mechanical mechanism 203 including a focus lens system 201, a zoom lens system 202 and aperture stop/filter portions, etc. A mechanical shutter of the mechanical mechanism 203 carries out exposure with respect to two fields.

Meanwhile, although a shutter mechanism is illustrated separately in FIG. 4 as an exposure device, the mechanical mechanism 203 may be used as the shutter mechanism as well.

The lens system 200 is, for example, constructed by a variable focal lens, and is structured by the focus lens system 201 and the zoom lens system 202.

The following are explanation of reference numerals in FIG. 4.

| | |
|---|---|
| 210: shutter motor | 211: shutter motor driver |
| 204: focus motor | 205: zoom motor |
| 206: aperture stop motor | 207: focus motor driver |
| 208: zoom motor driver | 209: aperture stop motor driver |
| 301: TG portion (Timing Generator) | |
| 302: CCD (Charge Coupled Device) | |
| 303: CDS (Correlated Double Sampling) circuit | |
| 304: variable gain amplifier (AGC amplifier) | |
| 305: A/D converter | |
| 306: IPP (Image Pre-Processor) | |
| 307: RAM (internal memory) | |
| 308: DCT (Discrete Cosine Transform) | |
| 309: coder (Huffman Encoder/Decoder) | |
| 310: MCC (Memory Card Controller) | |
| 311: card interface | |
| 312: PC card (including memory card etc.) | |
| 313: driver for external communication | |
| 400: controller (CPU, auxiliary lighting selector) | |
| 401: flash memory (EEPROM) | |
| 402: A/D converter for controller | |
| 403: D/A converter for controller | |
| 404: system bus line | 500: strobe (strobe circuit, strobe emitter) |
| 601: LCD driver circuit | 602: LCD display portion |
| 603: auxiliary light lamp | 604: driving circuit for auxiliary light lamp |
| 800: voice amplifying portion | 801: microphone |
| 802: speaker | 803: earphone |
| 900: operating portion | |
| 901: release switch for carrying out a command for photographing | |
| 902: mode inputting device | |

The digital camera comprises, furthermore, a power switch, a LCD switch, an auxiliary light lamp switch, buttons for carrying out selection of functions and setting of other various settings externally, and so on which are not shown. Meanwhile, a microphone sign, a camera sign, and a video sign marked on the mode inputting device 902 represent a voice recording mode, a still-image recording mode, and a video recording mode, respectively.

In addition, reference numerals 1001, 1002, 1100 and 1200 denote a vibration motor driver, a vibration motor, PC (Personal Computer), and an adapter for communication/power supply, respectively.

Next, operation of each of the constituent members will be described.

The focus motor driver 207 drives the focus motor 204 according to control signals supplied from the controller 400 to move the focus lens system 201 in directions of an optical axis. The zoom motor driver 208 drives the zoom motor 205 according to control signals supplied from the controller 400 to move the zoom lens system 202 in the optical axis direction. Also, the aperture stop motor driver 209 drives the mechanical mechanism 203 according to control signals supplied from the controller 400 to set aperture stop values, for example.

The timing generator (TG) 301 generates various timing signals based on horizontally synchronizing signals and vertically synchronizing signals inputted from the IPP 306 which will be described later.

The CCD (Charge Coupled Device) 302 converts an image inputted through a lens unit into electrical signals (analog image data). The CDS (Correlated Double Sampling) circuit 303 is a circuit for lowering noise with respect to an imaging element of CCD type.

The AGC amplifier 304 compensates a level of signals obtained by correlated double sampling in the CDS circuit 303. Meanwhile, setting data (control voltages) are set in the AGC amplifier 304 through the D/A converter which the AGC amplifier 304 includes.

The A/D converter 305 converts the analog image data inputted through the AGC amplifier 304 from the CCD 302 into digital image data. In other words, the signals outputted from the CCD 302 are converted into the digital signals with a most appropriate sampling frequency (for example, integral multiple of a subcarrier frequency of NTSC signals) by the CDS circuit 303 and the AGC amplifier 304, or the A/D converter 305.

The IPP (Image Pre-Processor) 306 as a digital signal processing portion separates the digital image data inputted from the A/D converter 305 into color difference (Cb, Cr) and luminance (Y), carries out various processing and compensation, and applies data processing to the digital image data for image compression/decompression.

The DCT (Discrete Cosine Transform) 308 as the digital signal processing portion carries out orthogonal transformation/reverse orthogonal transformation which are part of the image compression/decompression processes complying with JPEG, and the coder (Huffman Encoder/Decoder) 309 as the digital signal processing portion carries out Huffman encoding/decoding or the like which are also part of the image compression/decompression processes complying with JPEG, for example.

Also, the IPP 306 detects luminance data (Y) of the image data, and outputs an AE evaluated value which corresponds to the detected luminance data (Y) to the controller 400. The AE evaluated value represents the luminance (brightness) of a subject photographed. Furthermore, the IPP 306 outputs AWB (Auto White Balance) evaluated values which correspond to each of the luminance data (Y) of the R, G and B image data to the controller 400 within a set range of color temperatures.

The AWB evaluated values represent a color component of the subject. The MCC (Memory Card Controller) 310 temporarily stores the image applied with a compression process, and records the stored image into the PC card 312 or retrieves the image from the PC card 312, through the PC card interface 311.

The driver for external communication 313 communicates with an external unit by a communication protocol of USB or IEEE 1394 standard and so on, for example, to be connected with the PC (Personal Computer) 1100 or the like, so as to exchange data therewith. Alternatively, the driver for external communication 313 allows the PC 1100 and an AC adapter 703 to be connected with the digital camera through the adapter for communication/power supply 1200 which can be connected to the digital camera, so as to enable exchanging of power or communication.

The LCD display portion 602 is constituted by a transmissive LCD to which the image data and a menu for operation and so on are displayed. The auxiliary light lamp 603 is a backlight for lighting the LCD display portion 602, which is constituted by, for example, a fluorescent tube or a white LED. The driving circuit for auxiliary light lamp 604 outputs driving power to the auxiliary light lamp 603 based on control of the controller 400 to light the auxiliary light lamp 603.

The LCD driver circuit 601 is a circuit for displaying the image data inputted from the IPP 306 onto the LCD display portion 602.

The strobe (strobe circuit) 500 emits strobe light by the control of the controller 400.

The strobe (strobe circuit) 500 may be replaced by a LED driving circuit and a LED lighting, or may be used in combination with them.

The controller 400 is constituted by a CPU, ROM, RAM, A/D converter, and D/A converter and so on. The CPU controls the entire devices of the digital camera DC by using the RAM as a work area in accordance with a command from the operating portion 900 or an operating command inputted externally such as from a remote controller which is not shown.

Meanwhile, when the A/D converter and the D/A converter are to be provided external of the controller 400, they are provided as the A/D converter 402 and the D/A converter 403.

The controller 400, more specifically, controls photographing operation, auto exposure (AE) operation, operation for adjusting auto white balance (AWB), auto focus (AF) operation, and displaying and so on. Also, the controller 400 comprehends analog information by using the A/D converter 402 installed as one of information inputting devices for carrying out various control. The installed A/D 402 converter comprehends the analog information by comparing it with reference voltage.

On the other hand, the D/A converter 403 is used for an analog output.

For example, exchanging of control and data between the IPP 306 and the controller 400 are carried out through the system bus 404.

Additionally, the controller 400 includes a recording mode for recording the image data obtained by imaging the subject to the PC card 312, a playing mode for playing and displaying the image data recorded in the PC card 312 on the LCD display portion 602, and a monitoring mode for displaying imaged monitoring image onto the LCD display portion 602 directly, and so on.

As a displaying mode for displaying the image onto the LCD display portion 602 with the playing mode or the monitoring mode, there are fixed and outside light adjustment modes which can be selected by the operating portion 900.

The flash memory 401 is recorded with various parameters and data of the digital camera DC.

The voice amplifying portion 800 amplifies analog signals of the microphone 801, the speaker 802 and the earphone 803 through the A/D converter 402 or the D/A converter 403 included in the controller 400. It should be noted that a method of using a buzzer utilizing a not-shown output of the controller 400 may be employed in place of the speaker 802 as a voice outputting device.

The vibration motor 1002 is one of alarming devices. This alarming is performed by vibration, by means of operating the vibration motor driver 1001 by control signals from the controller 400 to drive the vibration motor 1002.

In accordance with the embodiments described in the foregoing, the present invention is preferably applicable to devices in which the voltage drop when the power is supplied drastically to a load from the battery having the large internal resistance is large.

According to the present invention, since the direct current power is supplied to the light emitting diode device (LED R, LED G and LED B shown in FIG. 1) from both the DC power supply device and the backup device when using the light emitting diode device, the supply voltage will not decrease.

According to one of the embodiments, since the charged current limiting device is provided, the rush current which flows to the backup device is limited, thereby preventing the problem that the DC power supply device becomes in the non-operated state by the activation of the output current limiting and protecting device.

According to another embodiment, although the voltage drop occurs when the general-purpose primary battery is selected due to the large internal resistance thereof, it is possible to backup the voltage drop with the backup voltage of the backup device. In a case where the exclusive-use secondary battery is selected, the rush current which would flow to the backup device is limited to suppress the voltage drop, since the charged current limiting device is provided. Alternatively, it is possible to virtually eliminate influence of the voltage drop at the time of charging the backup device if the exclusive-use secondary battery having large capacity is used.

According to further embodiment, since the output current limiting circuit is generally built in the separate power supply as well, it is possible to avoid the non-operation caused by the charging of the backup device. In this embodiment, since output resistance is low, the connection of the charged current limiting device may be disconnected in certain instances.

According to still further embodiment, since the direct current power supply unit for rectifying the commercial alternating current is available in the market as the general AC adapter, it is convenient for the user.

According to still further embodiment, more current flows at the time of activation of the LED drive circuit than in the steady-state in the light emitting diode device, and thereby the voltage drop becomes severe, since the rush current flows by the activation of the LED drive circuit in the initial stage of lighting thereof. Since it is possible to reduce capacity of the backup device if measures are taken only against the voltage drop, an advantage effect is obtained that start-up time immediately after exchanging of the batteries can be reduced.

According to the present invention, a more advantageous effect is obtained if the light emitting diode device and the strobe emitter are combined together and either one of them or both is used according to the condition of photographing. In this case, if power supplies are provided respectively, a size of the device becomes large and thus the convenience of user is impaired. Therefore, by using the part of the strobe power supply as the power supply for the auxiliary lighting of LED, it is possible to solve the problem that the size of the device becomes large.

Although the invention has been described in its preferred form with a certain degree of particularity, obviously many changes and variations are possible therein. It is therefore to be understood that the present invention may be practiced otherwise than as specified herein without departing from the scope and spirit thereof.

What is claimed is:

1. A power supply circuit for a digital camera, comprising:
   a power supply device which supplies power;
   an image inputting device driven by the power supplied from said power supply device;
   a strobe emitter driven by the power supplied from said power supply device and which auxiliarly illuminates a subject to be imaged by said image inputting device;
   a strobe emitter drive circuit inserted between the power supply device and the strobe emitter, and which supplies the power supplied from the power supply device to the strobe emitter to drive the strobe emitter;
   a light emitting diode device connected with the strobe emitter drive circuit and driven by the power supplied from the power supply device through the strobe emitter drive circuit, and which auxiliarly illuminates the subject to be imaged by the image inputting device; and
   a controller which selects at least one of said light emitting diode device and said strobe emitter to auxiliarly illuminate the subject, and which drives said strobe emitter drive circuit to supply the power supplied from the power supply device to the light emitting diode device to drive the light emitting diode device when said light emitting diode device is selected,
   the strobe emitter drive circuit including a blocking oscillation controlling circuit connected to an output side of the power supply device and controlled by the controller, and a boosting transformer inserted between the blocking oscillation controlling circuit and the strobe emitter and connected with the light emitting diode device, and driven by the block oscillation controlling circuit to output the power supplied from the power supply device to the strobe emitter and the light emitting diode device.

2. The power supply circuit for the digital camera according to claim 1, wherein the controller selects the light emitting diode device to auxiliarly illuminate the subject when close-photographing of the subject is performed, and selects the strobe emitter to auxiliarly illuminate the subject when distant-view photographing of the subject is performed.

3. The power supply circuit for the digital camera according to claim 1, further comprising a backup block including a backup element connected between an output side of the power supply device and which preliminarily charges the power supplied from the power supply device, and a discharging direction-rectifying device inserted between the backup element and the light emitting diode device and which turns on to supply the power charged in the backup element to the light emitting diode device when an output voltage of the power supply device becomes lower than a predetermined value.

4. The power supply circuit for the digital camera according to claim 1, further comprising a backup block including a backup element connected between an output side of the power supply device and the light emitting diode device, and which preliminarily charges the power supplied from the power supply device and supplies the charged power to the light emitting diode device.

* * * * *